Feb. 20, 1962 K. F. ROSS 3,022,503
CONTINUOUS WAVE ECHO-TYPE DISTANCE FINDER
Filed Jan. 6, 1959 2 Sheets-Sheet 1

INVENTOR:
Karl F. Ross

Feb. 20, 1962  K. F. ROSS  3,022,503
CONTINUOUS WAVE ECHO-TYPE DISTANCE FINDER
Filed Jan. 6, 1959  2 Sheets-Sheet 2

INVENTOR:
Karl F. Ross

United States Patent Office 3,022,503
Patented Feb. 20, 1962

3,022,503
CONTINUOUS WAVE ECHO-TYPE DISTANCE FINDER
Karl F. Ross, 5121 Post Road, Riverdale, N.Y.
Filed Jan. 6, 1959, Ser. No. 785,166
8 Claims. (Cl. 343—12)

My present invention relates to a system for measuring the length of an echo path extending from a transmitting station to a receiving station by way of a wave-reflecting object. Such systems are useful in determining the distance of an aircraft from the ground or of a ship from the ocean floor and, in principle, can operate with either acoustic or electromagnetic waves.

Distance-measuring systems of the character referred to can be divided into two groups, one involving the transmission of short, discrete pulses, the other utilizing a continuously transmitted wave. Pulse-type systems are ineffective at close range since an outgoing pulse will merge with the incoming echo if the distance of the reflecting object is short. In continuous-transmission systems it is known to determine distance from either a beat oscillation, derived from a progressively frequency-modulated outgoing wave, or from the phase of a low-frequency modulation on a high-frequency carrier; an alternative to the latter method resides in the direct transmission of a wave of relatively low frequency and the comparison between the phases of the outgoing and the reflected wave, a major disadvantage here being the reduced accuracy of long-wave echo systems and the limited availability of frequencies in the corresponding part of the spectrum.

The general object of my present invention is to provide an improved system of the continuous-transmission type utilizing an unmodulated single-frequency oscillation whose wavelength may be short compared with the distance to be measured, thereby minimizing the required bandwidth and enabling simultaneous readings to be taken at a multiplicity of nearby stations (e.g. aboard aircraft flying in formation) using different wavelengths.

In my co-pending application Ser. No. 612,865, filed September 28, 1956, now Patent No. 2,923,005, issued January 26, 1960, I have disclosed a radio location and warning system in which the distance of reflecting objects is determined with the aid of two waves progressively varying in frequency at different rates, the faster-varying wave being transmitted for reflection by an extraneous object and, when so reflected, being compared with the other wave in such manner that the time of occurrence of a predetermined frequency relationship between the two waves indicates the distance of the reflecting object. The system of my present invention has some similarity to that of my above-identified application in that a reflected wave is compared with a locally generated one, the present invention utilizing however a predetermined relationship in phase rather than in frequency to determine the length of the echo path. Advantageously, the transmitted wave has a constant frequency somewhat higher than that of the reference wave whereby a predetermined phase relationship existing at a certain time between the outgoing wave and the reference wave will occur between the latter and the reflected wave after an interval whose duration is proportional to the distance to be measured.

The invention will be described in greater detail in the accompanying drawing in which, for purposes of comparison, elements having counterparts in my Patent No. 2,923,005 have been given similar reference numerals. In the drawing.

Figure 1:
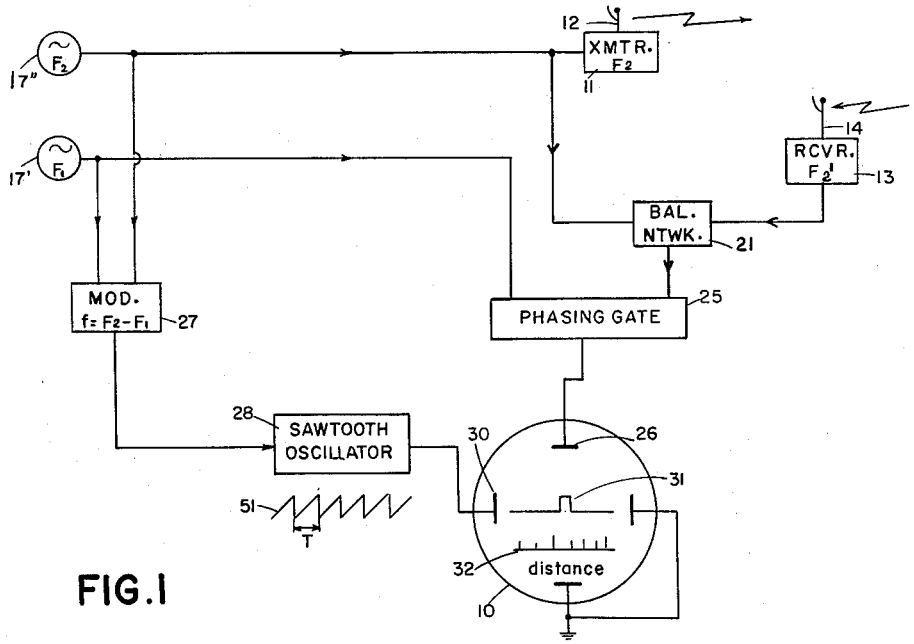
FIG. 1 is a block diagram of a transmitting and receiving station embodying the invention.

The system shown in FIG. 1, which may for example be installed aboard an aircraft, comprises a transmitting station 11 with directional antenna 12, a receiving station 13 with directional antenna 14, and a display indicator 10 constituted by the screen of a cathode-ray tube. At 17′, 17″ and 27 I have indicated sources of three frequencies $F_1$, $F_2$ and $f$, respectively, the last-mentioned frequency $f$ being equal to the difference $F_2-F_1$. In order to insure this relationship, sources 17′ and 17″ may be oscillators working into a modulator representing the source 27; the latter, by means of a suitable filter not separately shown, selects the lower one of the two side bands $F_2 \pm F_1$ in order to produce the relatively low frequency $f$. It will be understood that the same result may be obtained by separately generating the low frequency $f$ and either of the two high frequencies $F_1$, $F_2$, the other high frequency being then synthesized by a suitable modulator as has been illustrated in FIG. 3.

Wave source 17″ applies the high-frequency oscillation $F_2$ to the transmitter 11 and, in parallel therewith, to a balancing network 21 which receives the reflections $F_2'$ of that wave from the output of receiver 13. The balancing network 21 serves, in a manner well known per se, to compensate for unavoidable direct transmission between transmitter antenna 12 and receiver antenna 14. The reflected wave $F_2'$ from network 21 and the reference wave $F_1$ from source 17′ are applied to respective inputs of a circuit 25 which serves to produce a pulse whenever these two waves are in a predetermined phase relationship and which I have therefore designated a phasing gate; this circuit has been shown in greater detail in FIG. 2. Difference wave $f$ from modulator 27 controls a sawtooth oscillator 28 whose output is a sawtooth wave 51 having a period of recurrence T equal to an oscillatory cycle of wave $f$. Sawtooth wave 51 is impressed upon the ungrounded horizontal deflecting electrode 30 of cathode-ray tube 10 to whose ungrounded vertical deflecting electrode 26 the output of phasing gate 25 is applied. The deflection of the beam of tube 10 by the potential on the last-mentioned electrode produces a pip 31 at a location which, when read on a suitably graduated scale 32, gives the distance of the reflecting object from the observation post represented by the system of FIG. 1.

Figure 2:
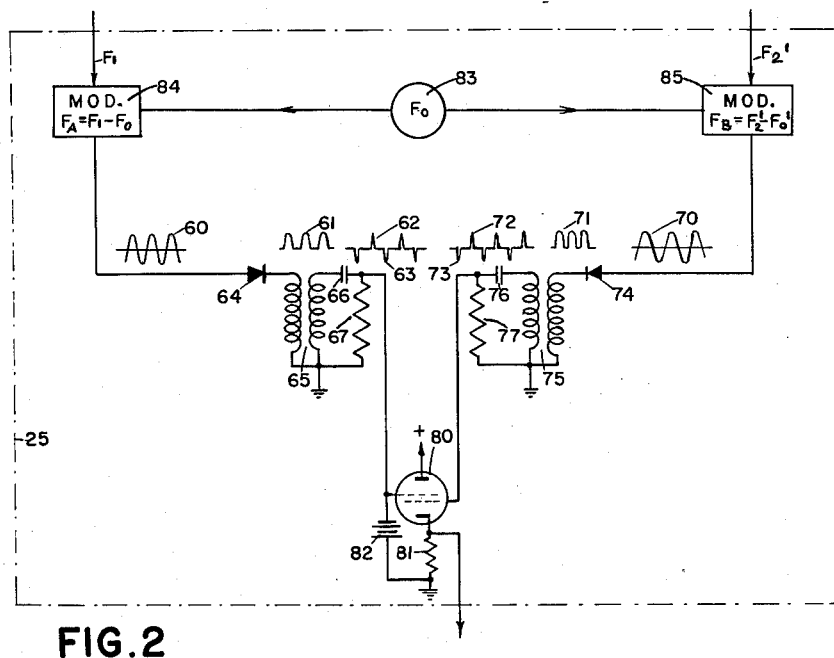
FIG. 2 is a circuit diagram of a phasing gate forming part of the station shown in FIG. 1.

As shown in FIG. 2, the phasing gate 25 may comprise a first rectifier 64 working into the primary of a transformer 65, a first differentiation circuit connected across the secondary of this transformer and including a series condenser 66 as well as a shunt resistor 67, a second rectifier 74 working into the primary of a transformer 75, and another, similar differentiation circuit 76, 77 connected across the secondary of the latter transformer. Rectifier 64 and transformer 65 convert a sinusoidal wave 60 of frequency $F_1$ into a pulsating wave 61 which is thereupon differentiated to provide a train of sharp positive pulses 62 alternating with similar negative pulses 63; in analogous manner, sinusoidal wave 70 of frequency $F_2$ is converted by rectification into a pulsating wave 71 from which sharp positive pulses 72 and similar negative pulses 73 are derived by differentiation. The arrangement so far described is similar to the phase discriminator disclosed in my prior U.S. Patent No. 2,557,038, issued June 12, 1951, and, if desired, may include additional circuitry for sharpening at least the positive pulses 62 and 72 which are the only ones of interest in the system of FIG. 2.

The outputs of differentiation circuits 66, 67 and 76, 77 are applied to respective input electrodes of an amplifier, here shown as the two grids of a vacuum tetrode 80 which is provided with a cathode resistor 81 and is normally biased to cutoff by a battery 82. Tube 80 will conduct only upon the simultaneous application of pulses 62 and 72 to its two grids, thereby producing an output pulse at the ungrounded terminal of resistor 81.

Figure 4:
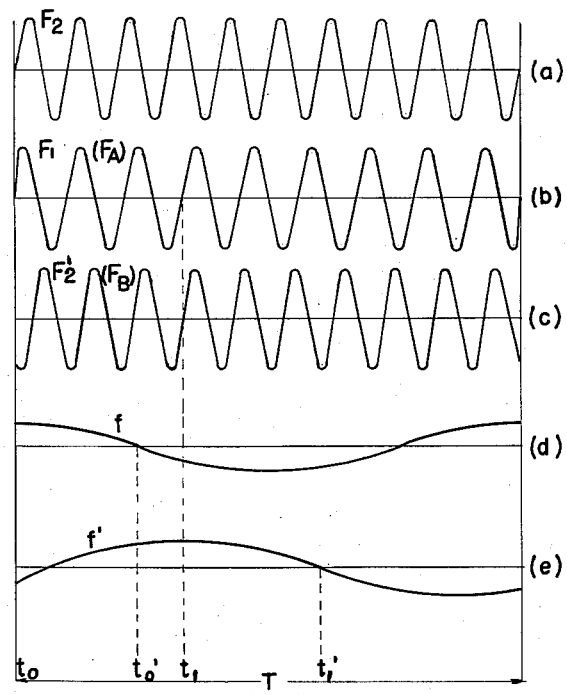
FIG. 4 is a graph serving to explain the operation of the systems of the preceding figures.

The operation of the system of FIGS. 1 and 2 will be better understood from graphs (a), (b), (c) and (d) of FIG. 4 showing, respectively, the outgoing wave $F_2$, the reference wave $F_1$, the reflected wave $F_2'$ and the difference wave $f$; while these waves have been shown in their correct phase relationship, it will be understood that in practice the frequencies of the first three waves may be many times higher, compared with that of wave $f$, than has been illustrated.

The higher-frequency wave $F_2$ may be considered as having been derived from the lower-frequency wave $F_1$ by a progressive advance of its phase at a rate equaling $f$ cycles per second. Thus, waves $F_1$ and $F_2$ will be in phase once during each cycle of low-frequency wave $f$, more particularly at the instant $t_0$ when this latter wave goes through positive peak. As far as the reflected wave $F_2'$ is concerned, its phase relationship with reference wave $F_1$ will be similar but the occurrence of the in-phase condition will be shifted to a time $t_1$ within the cycle T, the interval $t_1-t_0$ being proportional to the length of the echo path and, therefore, to the distance of the reflecting object. Since the occurrence of a pulse in the output of phasing gate 25 denotes such in-phase relationship, the location of pip 31 on the screen of tube 10 will in fact be representative of that distance. Naturally, the low-frequency oscillation $f$ must have a wavelength greater than twice the desired operating range of the system if equivocal readings are to be avoided; with $f=100$ kc., for example, the maximum range will be 1,500 meters or about one mile.

If the frequencies of waves $F_1$ and $F_2'$ are too high to enable a direct comparison of their phases by a circuit arrangement as described above, they may be differentially combined with an auxiliary frequency $F_0$ to produce two intermediate frequencies $F_A$ and $F_B$ having the same phase relationship. This has been illustrated in FIG. 2 where an oscillator 83, when operated, produces the auxiliary frequency $F_0$ and applies it to two modulators 84 and 85 respectively receiving the frequencies $F_1$ and $F_2'$ from source 17' and from network 21.

Figure 3:
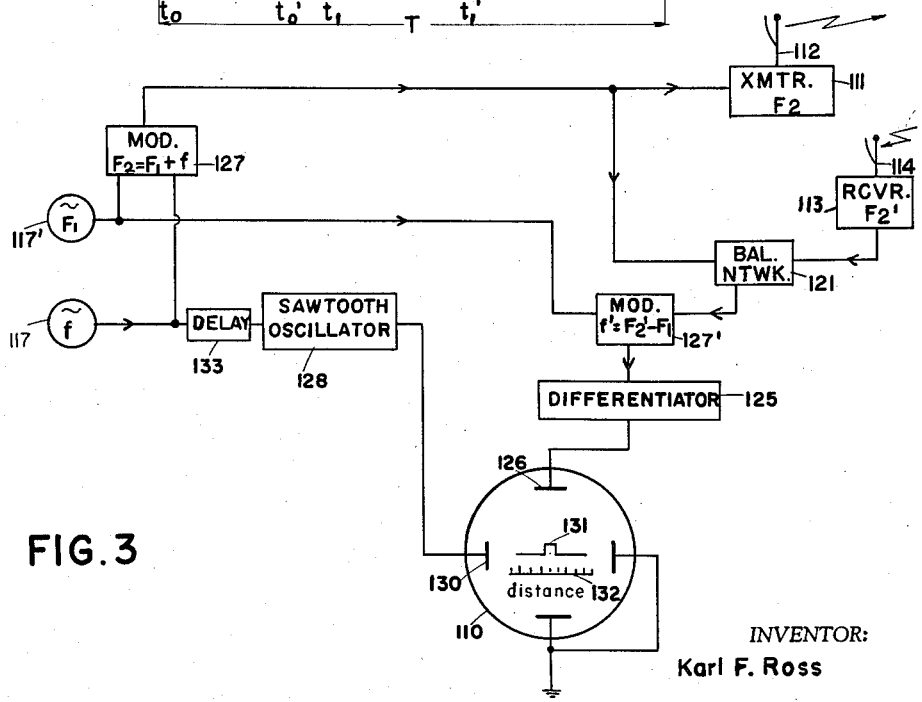
FIG. 3 is a block diagram showing a modification of the system illustrated in FIGS. 1 and 2.

Another circuit arrangement for comparing the phases of a reference wave $F_1$ and of a reflected wave $F_2'$ has been shown in FIG. 3. There the high-frequency wave $F_1$ is produced by an oscillator 117' which works into two modulators 127 and 127', the former receiving the low frequency $f$ from an oscillator 117 to produce the outgoing frequency $F_2$ which is radiated by antenna 112 of transmitter 111 and is also applied to balancing network 121, the latter obtaining from the output of that network the reflected wave $F_2'$ as intercepted by antenna 114 of receiver 113. Frequency $f$ from source 117 is also fed through a delay circuit 133 to sawtooth oscillator 128 to energize the horizontal deflecting electrode 130 of cathode-ray tube 110; the output of modulator 127' is a low frequency $f'$ which is applied to a differentiator 125 to produce pulses impressed upon deflecting electrode 126. The resulting pips 131 on the screen of tube 110 indicate the distance of a reflecting object on the scale 132. The differentiator 125 may include a rectifier, a transformer, a condenser and a resistor similar to the elements 64–67 or 74-77 shown in FIG. 2.

As illustrated in graph (e) of FIG. 4, the low-frequency wave $f'$ has the same period as wave $f$ but is displaced in phase with respect thereto; thus, the instants at which the two waves go through zero on the negative swing, designated respectively $t_0'$ and $t_1'$, are separated by an interval equal to the interval $t_1-t_0$ denoting the phase shift between the outgoing wave $F_2$ and the reflected wave $F_2'$. If, therefore, the delay circuit 133 is adjusted to trigger the sawtooth oscillator 128 at the instant $t_0'$, and if differentiator 125 operates to produce a pulse at the instant $t_1'$, the indicator 110 will operate in the manner previously set forth. Naturally, the pulse generator 125 could also operate on some other predetermined portion of wave $f'$, e.g. on the beginning of the leading edge of its positive half cycle. A delay circuit similar to that shown at 133 may also be included in the system of FIG. 1 if sawtooth oscillator 128 is arranged to respond to a portion of the controlling wave $f$ other than its positive peak, if distance is to be measured from a point other than the location of transmitter 11, or if delays in other parts of the system have to be compensated.

It will be understood that the cathode-ray tube 10 or 110 is representative of a variety of display indicators and that other indicating means could be used in lieu thereof, including various types of recording apparatus if an immediate visual display of the measured distance is not required; naturally, the vertical deflection of the beam of that tube could also be replaced by a change in the intensity of the beam. Also, other phase-comparison circuits known per se may be utilized instead of those specifically described and illustrated. Moreover, the principles herein disclosed may be applied to sonic and supersonic waves as well as to electromagnetic radiation. Finally, the transmitter 11, 111 and the receiver 13, 113 may be positioned at geographically separated locations, e.g. for the purpose of measuring the major axis of an elliptical locus as disclosed in my U.S. patent application Ser. No. 472,793, filed December 3, 1954, now Patent No. 2,920,320, issued January 5, 1960. The invention, accordingly, is not limited to the specific embodiments described and illustrated but may be realized in various modifications without departing from the spirit and scope of the appended claims.

I claim:

1. A system for measuring the length of a path traveled by wave energy echoed by a wave-reflecting object, comprising source means for producing a continuous reference sine wave and a continuous outgoing sine wave of different frequencies, the frequency difference between said waves corresponding to a wavelength exceeding the path length to be measured, transmitting means for sending out said outgoing wave, receiving means for intercepting echoes of said outgoing wave reflected by said object, first pulse-producing means responsive to the occurrence of a predetermined phase relationship between said reference wave and said outgoing wave, second pulse-producing means responsive to the occurrence of a like phase relationship between said reference wave and the intercepted echo of said outgoing wave, and output means controlled by said first and second pulse-producing means for indicating the time interval elapsed between said occurrences.

2. A system according to claim 1 wherein said first pulse-producing means comprises means for producing a low-frequency wave having a frequency equaling said frequency difference, and means for converting said low-frequency wave into a train of pulses.

3. A system according to claim 2 wherein said output means comprises a cathode-ray tube, sweep means controlled by said first pulse-producing means for periodically deflecting the beam of said tube in the rhythm of said low-frequency wave, and beam-control means responsive to said second pulse-producing means for indicating a distance varying with said time interval.

4. A system according to claim 2 wherein said second pulse-producing means comprises means for producing another low-frequency wave, with a frequency equaling said frequency difference, by differentially modulating said reference wave with said echo, and means for converting the last-mentioned wave into another train of pulses, said output means comprising means for measuring the time interval between pulses of said two trains.

5. A system according to claim 1 wherein said second pulse-producing means comprises two differentiation circuits energizable from said source means and said receiving means, respectively, and a circuit adapted to produce a pulse in response to instantaneous coincidence between the outputs of said two differentiation circuits.

6. A system according to claim 5 wherein said second pulse-producing means further comprises means for producing an auxiliary frequency and means for applying to said differentiation circuits two intermediate frequencies obtained by differentially modulating said auxiliary frequency with said reference wave and with said echo, respectively.

7. A system for visually indicating the distance of a wave-reflecting object from an observation post, comprising source means at said post for producing a continuous reference sine wave and a continuous outgoing sine wave of higher frequency than said reference wave, the frequency difference between said waves corresponding to a wavelength exceeding twice the distance to be measured, transmitting means at said post for sending out said outgoing wave, receiving means at said post for intercepting echoes of said outgoing wave reflected by said object, first pulse-producing means responsive to the occurrence of a predetermined phase relationship between said reference wave and said outgoing wave, second pulse-producing means responsive to the occurrence of a similar phase relationship between said reference wave and the intercepted echo of said outgoing wave, and display means controlled by said first and second pulse-producing means for indicating the time interval elapsed between said occurrences.

8. A system according to claim 7 wherein said display means comprises a cathode-ray tube having sweep means for its beam, said first pulse-producing means comprising a sawtooth oscillator controlling said sweep means, means for producing a low-frequency wave having a frequency equaling said frequency difference, and means for triggering said oscillator in the rhythm of said low-frequency wave.

References Cited in the file of this patent
UNITED STATES PATENTS

| | | |
|---|---|---|
| 2,147,810 | Alford | Feb. 21, 1939 |
| 2,451,000 | Smith | Oct. 12, 1948 |
| 2,532,221 | Bradley | Nov. 28, 1950 |